United States Patent
Abramovich et al.

(10) Patent No.: US 7,145,503 B2
(45) Date of Patent: Dec. 5, 2006

(54) SURFACE WAVE RADAR

(75) Inventors: Yuri Abramovich, Beaumont (AU);
Pavel Turcaj, Hawthorn (AU);
Nicholas Keith Spencer, Kensington Park (AU); Robert M Ellard, Elizabeth East (AU); Yuriy Lyudviga, Campbelltown (AU)

(73) Assignee: Telstra Corporation Limited, Victoria (AU)

( * ) Notice: Subject to any disclaimer, the term of this patent is extended or adjusted under 35 U.S.C. 154(b) by 0 days.

(21) Appl. No.: 10/291,697

(22) Filed: Nov. 12, 2002

(65) Prior Publication Data

US 2003/0142011 A1 Jul. 31, 2003

(30) Foreign Application Priority Data

Nov. 12, 2001 (AU) .................. PR8811/01

(51) Int. Cl.
*G01S 7/292* (2006.01)
*G01S 13/02* (2006.01)
*G01S 13/04* (2006.01)
*G01S 13/18* (2006.01)

(52) U.S. Cl. .................. 342/159; 342/26 R; 342/26 D; 342/27; 342/28; 342/89; 342/91; 342/93; 342/94; 342/118; 342/175; 342/188; 342/195

(58) Field of Classification Search .......... 342/22, 342/27, 28, 82–103, 118, 159, 175, 192, 193–197, 342/26 R–26 D, 119–146, 160–164, 188, 342/378–384; 343/830
See application file for complete search history.

(56) References Cited

U.S. PATENT DOCUMENTS 3,705,407 A * 12/1972 Wickersham ............... 343/830

6,246,365 B1    6/2001 Tokoro

FOREIGN PATENT DOCUMENTS

| AU | 658410 B | 11/1992 |
|----|----------|---------|
| RU | 2013784 C1 | 5/1994 |
| RU | 2160452 C2 | 12/2000 |
| WO | WO 92/21041 | 11/1992 |

OTHER PUBLICATIONS

A.M. Ponsford, "A Comparison Between Predicted and Measured Sea Echo Doppler Spectra for Surface Wave Radar"; IEEE Publication 0-7803-1385-2/93/$3.00; 1993.*

T.M. Blake, "Ship Detection and Tracking Using High Frequency Surface Wave Radar"; "HF Radio Systems and Techniques" Conference Publication No. 411; IEE, 1997.*

H. Leong, "Adaptive Nulling of Skywave Interference Using Horizontal Dipole Antennas in a Costal Surveillance HF Surface Radar System"; Radar '97 Conference Publication No. 449; Oct. 14-16, 1997.*

(Continued)

*Primary Examiner*—Bernarr E. Gregory
(74) *Attorney, Agent, or Firm*—Sughrue Mion, PLLC

(57) ABSTRACT

A surface wave radar system including a receive antenna array (20, 22) for generating receive signals, and a data processing system (24) for processing received data representing the receive signals to mitigate ionospheric clutter. The received data is range and Doppler processed, and a spatial adaptive filter (52) is trained using training data selected from the processed data. The training data includes ionospheric clutter data and excludes cells which contain target data and substantial sea clutter. The processed data is filtered using the filter (52), which may be based on loaded sample matrix inversion. The antenna array (20,22) may be two-dimensional having an L or T shape.

22 Claims, 16 Drawing Sheets

OTHER PUBLICATIONS

H.W.H. Leong, Adaptive Suppression of Skywave Interference in HF Surface Wave Radar Using Auxiliary Horizontal Dipole Antennas; IEEE Publication 0-7803-5582-2/99/$10.00; 1999.*

S.J. Ablett et al., "Waveform Parameter Advice: A Clutter Evaluation Tool for High Frequency Surface Wave Radar"; "HF Radio Systems and Techniques" Publication No. 474; no date given.*

L. Pederson et al., "HF Surface-Wave Radar: Revisiting a solution for EEZ ship surveillance"; posted on the Internet at eezinternational.com; no date given.*

D. Barrett, "The Chain Home radar system"; posted on the Internet at radarpages.co.uk; copyright 2000-2005.*

"An Integrated Maritime Surveillance System Based on High-Frequency Surface Wave Radars, Part 1: Theroretical Background and Numerical Simulations", Wevgi, A Ponsford and H C Chan, IEEE Antennas and Propagation Magazine, vol. 43. No. 4, pp. 28-43, Aug. 2001.

"An integrated Surveillance System Based on High-Frequency Surface Wave Radars, Part 2: Operational Status and System Performance", A Ponsford, L Sevgi, H C Chan, IEEE Antennas and Propagation Magazine, vol. 43, No. 5, pp. 52-63, Oct. 2001.

Abramovich, Y.I., et al.: "Experimental Trials on Non-Gaussian Environmental Noise Mitigation for Surface-Wave Over-the-Horizon Radar by Adaptive Antenna Array Processing," Higher Order Statistics, 1999. Proceedings of the IEEE Signal Processing Workshop on Caesarea, Israel Jun. 14-16, 1999, Los Alamitos, CA, USA, IEEE Comput. Soc., US. Jun. 14, 1999, pp. 340-344.

Leong, H.W.H.: "Adaptive Suppression of Skywave Interference in HF Surface Wave Radar Using Auxiliary Horizontal Dipole Antennas," Communications, Computers and Signal Processing, 1999 IEEE Pacific Rim Conference on Victoria, BC, Canada, Aug. 22-24, 1999, Piscataway, NJ, USA, IEEE, USA, Aug. 22, 1999, pp. 128-132.

Kraut, S., et al.: "Space-Time Adaptive Processing For Over-the-Horizon Spread-Doppler Clutter Mitigation," Proceedings of the 2000 IEEE Sensor Array and Multichannel Signal Processing Workshop, Duke University, Durham, NC, USA, Mar. 16-17, 2000, pp. 245-249.

Ablet, S.J., et al.: "Waveform Parameter Advice: A Clutter Evaluation Tool for High Frequency Surface Wave Radar," Eight International Conference on HF Radio Systems and Techniques (IEE Conf. Publ. No. 474)., Jul. 10-13, 2000, pp. 213-217.

"Modern Radar Techniques", M.J.B. Scanlan, pp. 200-2003 and 224-227.

"Radar Handbook", Skolnik Second Edition, 1990, pp. 24.1, 24.2, 24.38-40.

"A Radar History of Work War II, Technical and Military Imperatives", Brown, IOP Publishing Ltd., 1999, pp. 48-59.

"History, Present Status, and Future Directions of HF Surface-Wave Radars in the US", Barrick, IEEE, 2003, pp. 652-655.

* cited by examiner

SURFACE WAVE RADAR

FIELD OF THE INVENTION

The present invention relates to a surface wave radar system and a method for processing data of a surface wave radar receiver.

BACKGROUND

Surface wave radar systems, in particular high frequency surface wave radar (HFSWR) systems, have recently been developed to overcome the line-of-sight limitation of microwave radar systems. HFSWR exploits a phenomenon known as a Norton wave propagation whereby a vertically polarised electromagnetic signal propagates efficiently as a surface wave along a conducting surface. HFSWR systems operate from coastal installations, with the ocean providing the conducting surface. The transmitted signal follows the curved ocean surface, and a system can detect objects beyond the visible horizon, with a range of the order of 200 km.

The successful detection of a target by a surface wave radar system traditionally involves compromises between a number of factors, including propagation losses, target radar cross-section, ambient noise, man-made interference, and signal-related clutter. It is desired to provide an improved surface wave radar system and data processing method, or at least a useful alternative to existing surface wave radar systems and methods.

SUMMARY OF THE INVENTION

In accordance with the present invention there is provided a surface wave radar system including:
  a receive antenna array for generating receive signals; and
  a data processing system for processing received data representing said receive signals to mitigate ionospheric clutter.

The present invention also provides a surface wave radar system having a two-dimensional receive antenna array.

The present invention also provides a method for processing range and Doppler processed data in a surface wave radar receiver, including, for each range, the steps of:
  training a spatial adaptive filter using training data of said processed data, said training data including ionospheric clutter data and excluding target data ; and
  filtering said processed data using said filter.

The present invention also provides a data processing system for processing received surface wave radar data to mitigate ionospheric clutter.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENT

Figure 1:
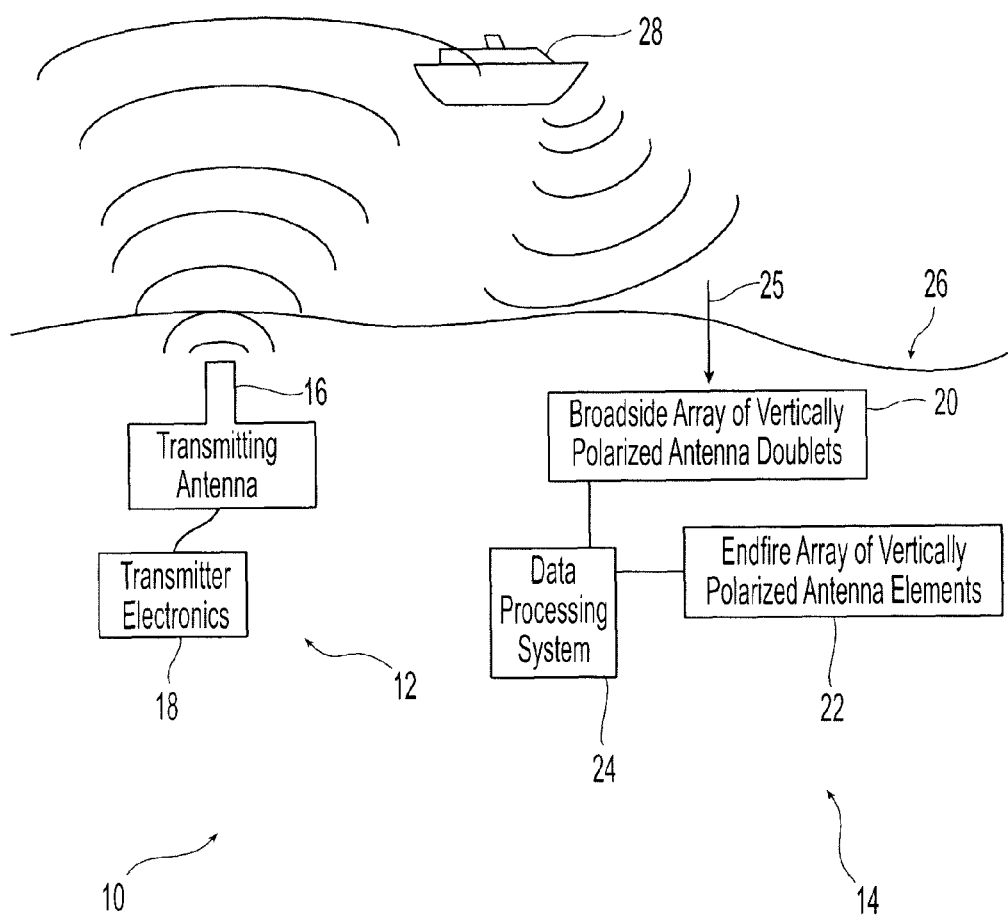
FIG. 1 is a schematic diagram of a preferred embodiment of a surface wave radar system.

A surface wave radar system, as shown in FIG. 1, includes a transmitter 12, and a receiver 14. The transmitter 12 includes transmitter electronics 18 and a transmitting antenna 16. The transmitting antenna 16 is a directional broadband antenna, such as a log-periodic antenna array, capable of generating a substantial surface wave and a relatively insubstantial overhead skywave. The transmitting antenna 16 transmits high frequency (5–10 MHz) electromagnetic surface wave signals from a shoreline 26 across the ocean surface. The transmitted signals are reflected from objects such as a ship 28, and reflected surface wave signals are received by the receiver 14.

Figure 2:
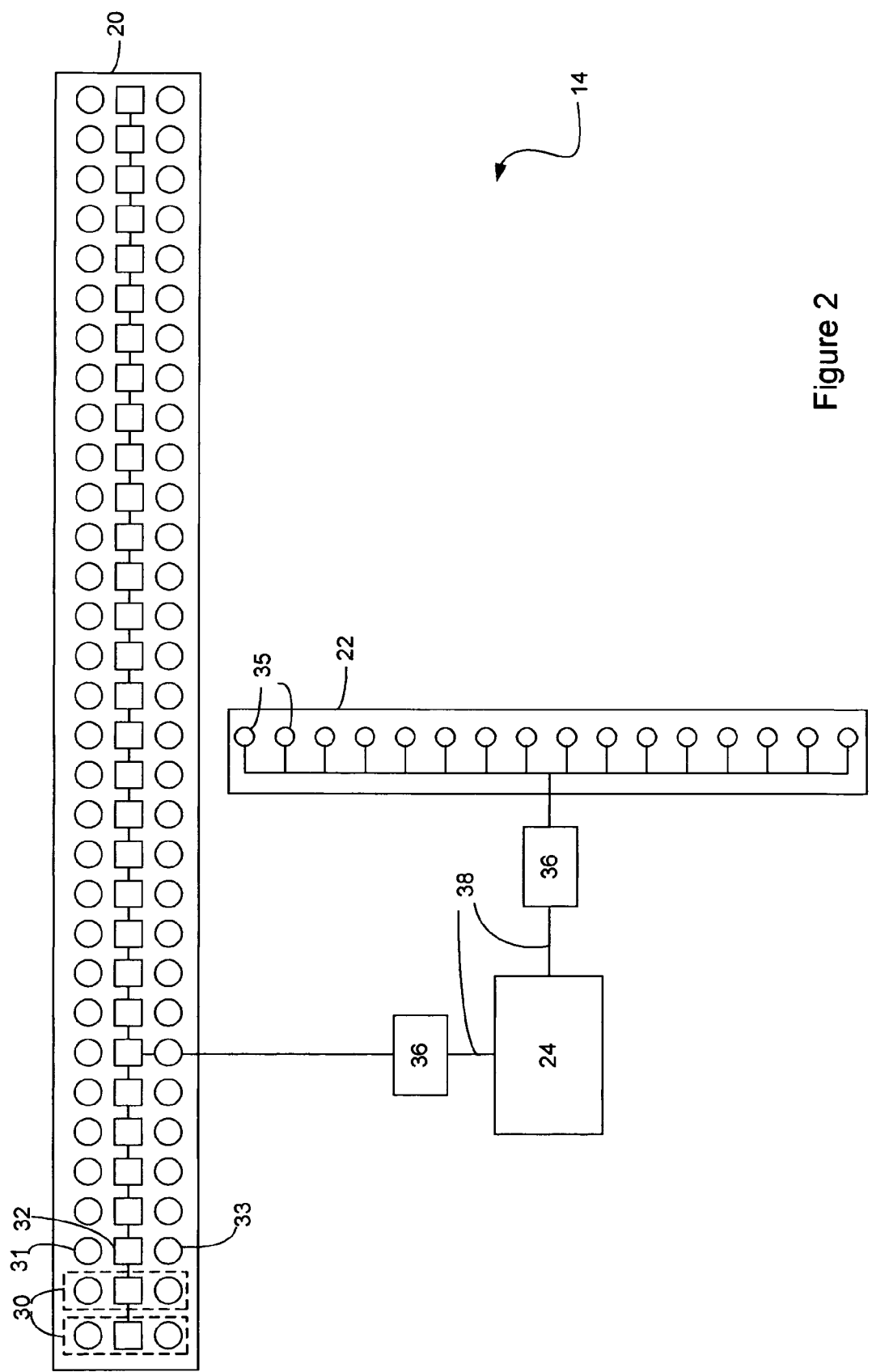
FIG. 2 is a schematic diagram of a receive antenna array of the system.
Figure 3:
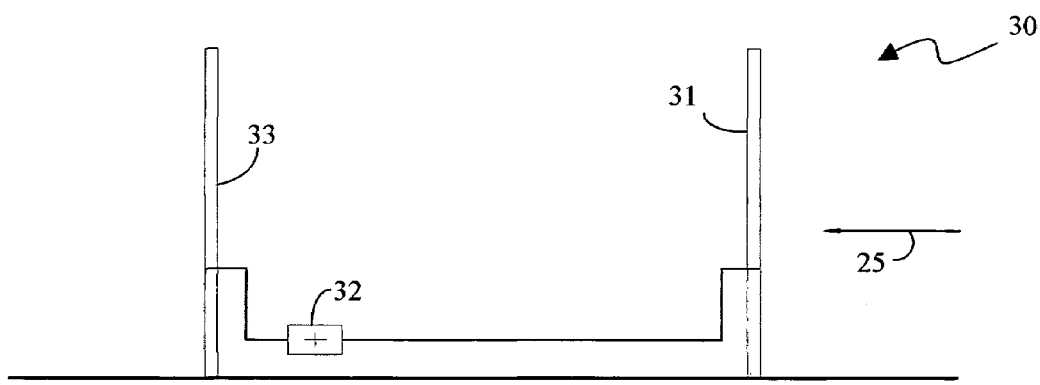
FIG. 3 is a schematic diagram of a doublet antenna element of the receive antenna array.

As shown in FIGS. 1 and 2, the receiver 14 includes a data processing system 24 and a broadside array 20 of vertically polarised antenna doublets 30. The broadside array 20 is oriented approximately perpendicular to a principal receiving direction 25 for reflected surface wave signals, and, in this case, is approximately parallel to the shore 26. As shown in FIGS. 2 and 3, each doublet element 30 of the broadside array 20 includes front 31 and rear 33 vertically polarised monopole elements, coupled by a hybrid transformer 32. The front element 31 of the doublets 30 is closer to the shore 26 and to surface wave signals approaching from the receiving direction 25. This arrangement and the coupling transformer 32 enhance the sensitivity of the antenna 20 to signals received from the ocean whilst attenuating signals received from behind the antenna 20. The number of independent receive antenna elements or doublets 30 is limited by the number of independent data channels available for data processing. In the described embodiment, thirty-two data channels are available, as described below, and therefore the broadside array 20 includes thirty-two doublets 30. However, it will be apparent that additional data channels, and therefore, antenna elements or doublets 30, can be used to improve the system performance.

Figure 4:
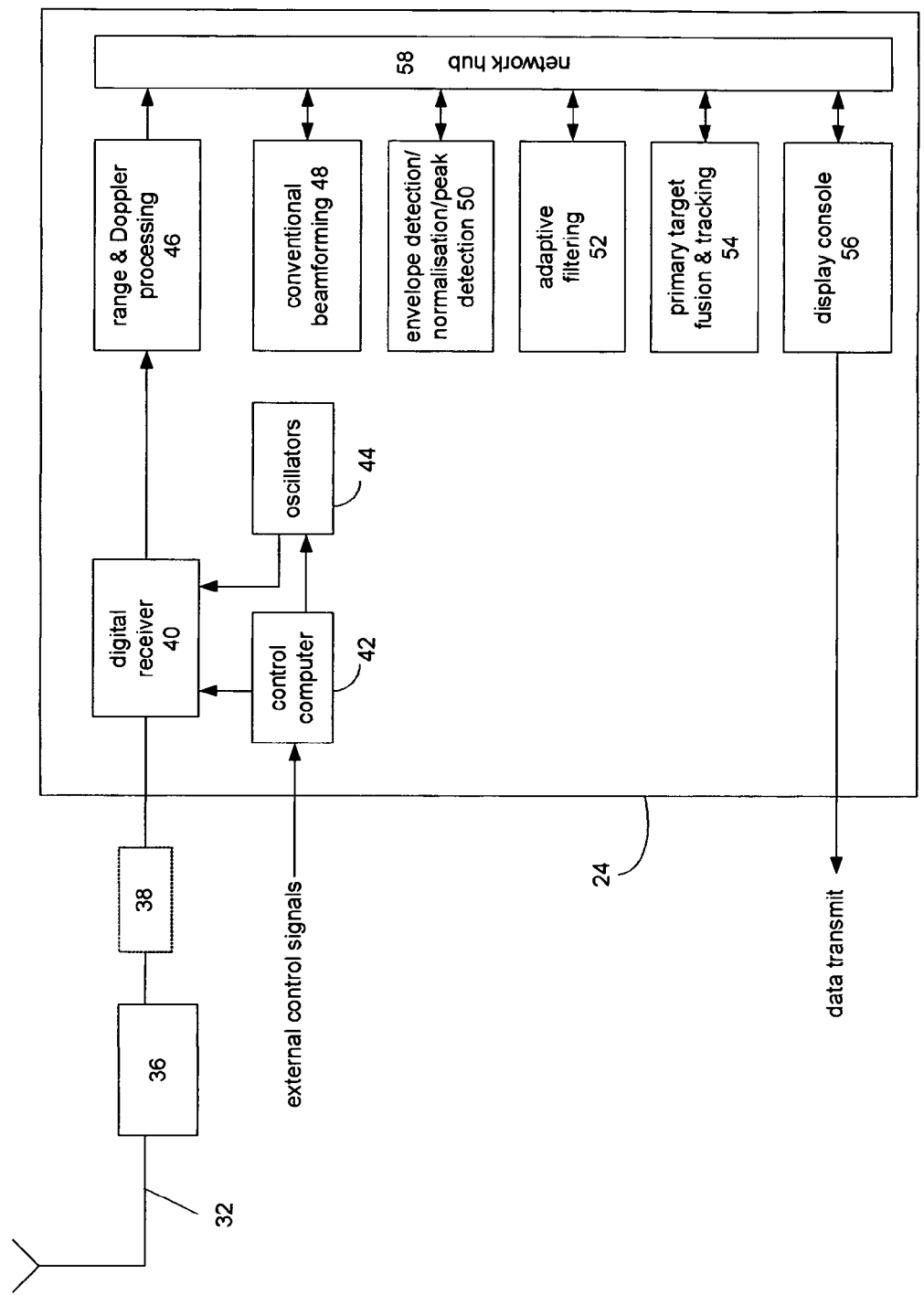
FIG. 4 is a block diagram of a receiver of the system.

As shown in FIGS. 2 and 4, the thirty-two doublets 30 are connected to respective pre-amplifier units 36 of the receiver 14, and to the data processing system 24 via a coaxial antenna feeder 38. The data processing system 24 includes a multi-channel digital receiver 40 controlled by a control computer 42, using oscillators 44 for frequency control. The data processing system 24 also includes data processing components 46 to 54, and a display console 56. The control computer 42, data processing components 46 to 54, and display console 56 each include standard computer systems, such as Intel Pentium III® based personal computers running a Unix® operating system. The computer systems of the data processing components 46 to 54 are also each provided with four digital signal processor (DSP) cards, including three Transtech TS-P36N DSP cards with four TigerSHARC processors, and one BlueWave PCI/66 card with six SHARC 21062 processors. The DSP cards communicate via 64 bit/66 MHz PCI slots of the data processing components 46 to 54. The data processing components 46 to 54 provide a range & Doppler processing system 46, a conventional beamforming system 48, an envelope detection/normalisation/peak detection system 50, an adaptive filtering system 52, and a primary target fusion & tracking system 54. These systems 46 to 54 and the display console 56 communicate via a network hub 58.

Figure 5:
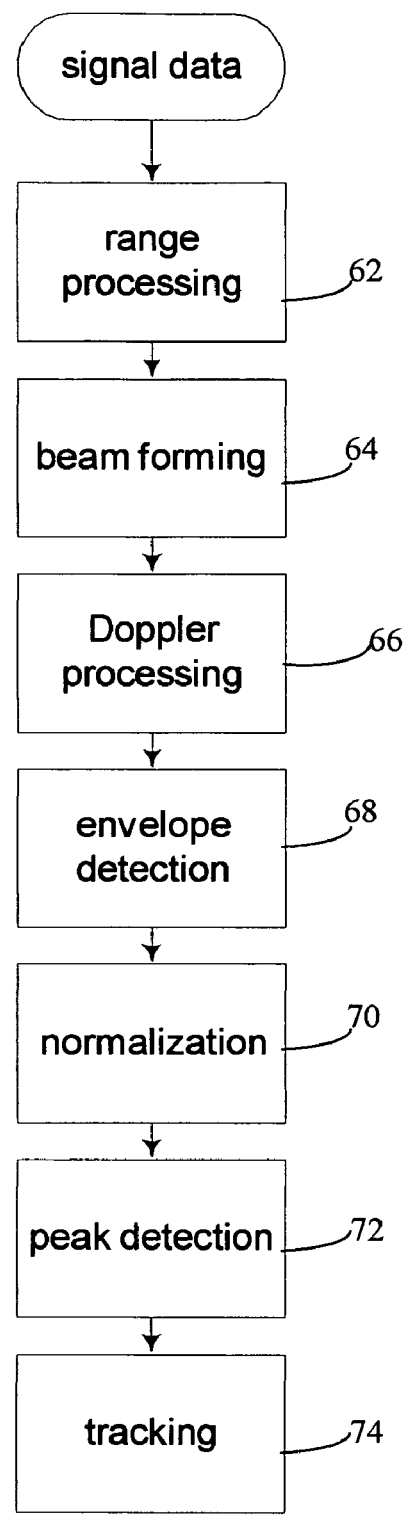
FIG. 5 is a flow diagram of a prior art data process.

A standard, prior art process for analysing surface wave radar data, as shown in FIG. 5, can be executed by the data processing system 24. The process begins by range processing 62 digitised radar data provided by the multi-channel receiver 40 in the range and Doppler processing system 46. The radar data represents signals received by the antenna elements 30 over time. Range processing 62 determines ranges corresponding to the data in accordance with the time delay between the time a signal was transmitted by the transmitter 12 and the time the reflected signal was received by the receiver 14. The range processed data is then sent via the network hub 58 to the beamforming system 48 where a beamforming step 64 processes the data to generate data corresponding to particular azimuthal receiving directions at the receiving antenna. The beamformed data is then sent to the range and Doppler processing system 46 where it undergoes Doppler processing at step 66 to associate radial velocities with the data according to Doppler-shifts in frequency. The resulting data is then sent to the envelope detection/normalisation/peak detection system 50, where, at step 68, envelope detection is performed to determine signal amplitudes for each range. Normalisation 70 and peak detection 72 are then performed in order to identify targets. A tracking process 74 is performed by the primary target fusion & tracking system 54 to determine which targets identified at step 72 correspond to targets previously identified in order to track those targets as they move over time.

Figure 7:
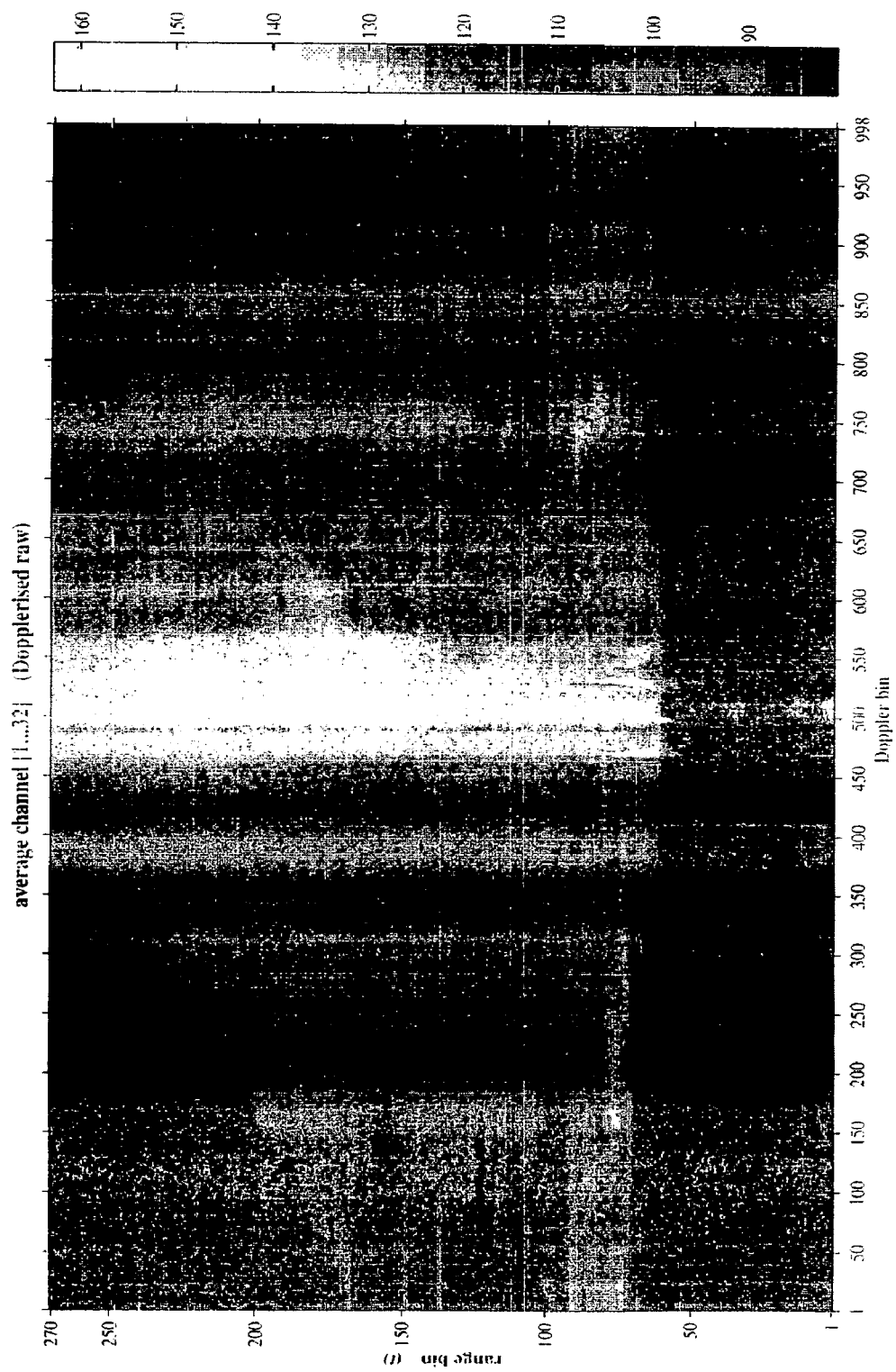
FIG. 7 is a range-Doppler plot showing ionospheric clutter in data processed by the prior art data process of FIG. 5.

FIG. 7 is a graph of radar data from all thirty-two antennas, as processed by the prior art process of FIG. 5, presented as range bin versus Doppler bin, and using a grayscale to represent signal strength. The first reflected signals received by the receiver 14 correspond to the data in range bins near bin number 60. Accordingly, any data within the darkly coloured range bins 1 to 60 corresponds to negative range cells and to external background noise detected by the system prior to receiving reflected radar signals. Range bins from 60 through 270 are dominated by these reflected signals.

The data of FIG. 7 is characterised by a large degree of signal-related clutter, visible as broadband signals spread across a wide range of Doppler bins for each range bin. It was found that this spread clutter is exacerbated at locations close to the equator, such as the northern coast of Australia, and is primarily ionospheric clutter resulting from enhanced backscattering of the transmitted signal from the ionosphere in these regions. This ionospheric clutter was found to mask low level signals, particularly those representing slowly moving objects. Detailed investigations demonstrated that the clutter affects most of the operational range of 80–200 km, and in most cases significantly exceeds the background noise level. The clutter resulted in a severe degradation in overall performance, leading to poor target detection, an increased false alarm rate, and poor tracking accuracy.

Figure 8:
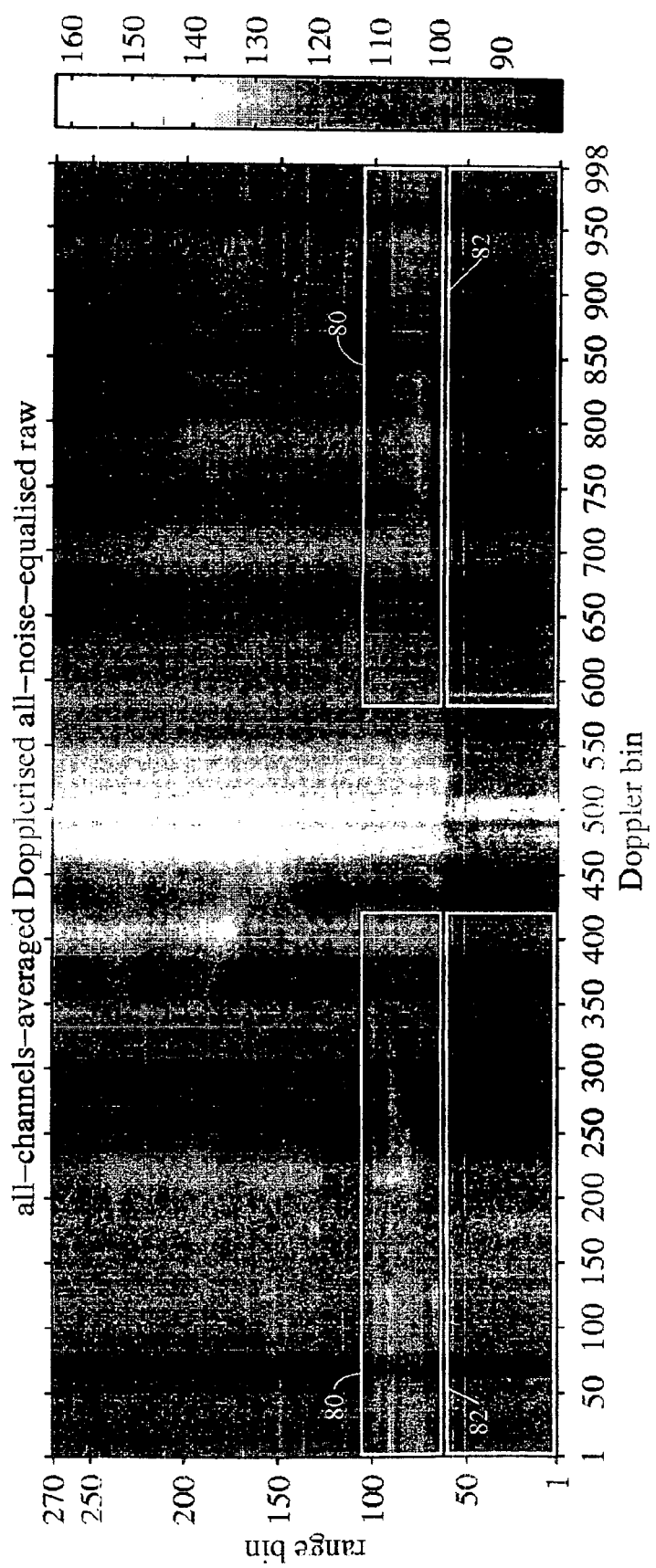
FIG. 8 is a range-Doppler plot showing the windows used to evaluate ionospheric clutter and external noise.

To determine the characteristics of ionospheric clutter, range-Doppler ionospheric clutter windows 80 were defined, as shown in FIG. 8, to be restricted to Doppler cells that have a significant Doppler shift from the first-order Bragg lines in order to exclude possible high-speed Doppler components of the "normal", i.e., anticipated, surface-wave propagated sea-clutter spectrum. For example, the ionospheric clutter windows 80 of FIG. 8 include range bins from 60 to 105, corresponding to ranges from zero to above 200 km, and includes all Doppler bins except Doppler bins 420–580 centered about zero Doppler shift. Detailed analysis indicates that this underestimates the ionospheric clutter, because the most powerful components of ionospheric clutter are typically located in the same Bragg line area of the range-Doppler map as the energetic sea-clutter components. For comparison, range-Doppler noise windows 82 were also defined to assess the external noise received by the system. For example, the noise windows 82 of FIG. 8 include all data in range bins from 1 to 59, corresponding to negative ranges, and using the same Doppler bins that are used for the ionospheric clutter windows 80.

Figure 9:
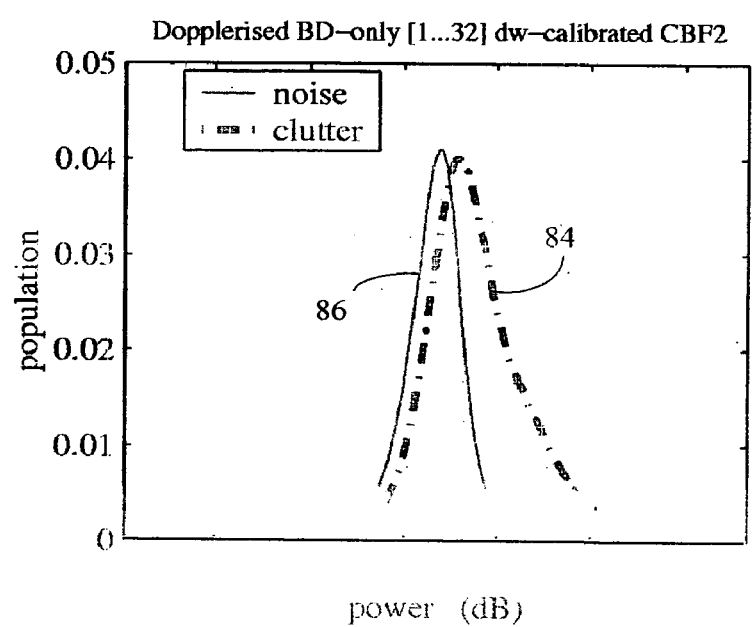
FIG. 9 is a graph showing the power spectra of ionospheric clutter and external noise derived from the range-Doppler windows shown in FIG. 8.

FIG. 9 is a graph of the overall distributions of ionospheric clutter power 84 and background noise power 86 in all beams derived from the ionospheric clutter windows 80 and the noise windows 82, respectively. The graph indicates that for slow (surface) target detection, it is transmission-related (passive) backscattered clutter 84, rather than external noise 86, that limits detection performance. In all instances with low background noise, the overall power of the ionospheric clutter component within the range of interest exceeded the background noise power. A significant feature of the ionospheric component is its erratic range profile. In many instances, ionospheric clutter appears immediately after the direct wave signal, while in other cases there is a significant range depth that is practically free of ionospheric clutter. This diversity excludes some simple explanations for ionospheric clutter, such as transmitter phase noise. Moreover, the spatial properties of the ionospheric clutter are significantly different for different ranges within the coverage, suggesting that several mechanisms may be responsible for the clutter signals.

Figure 6:
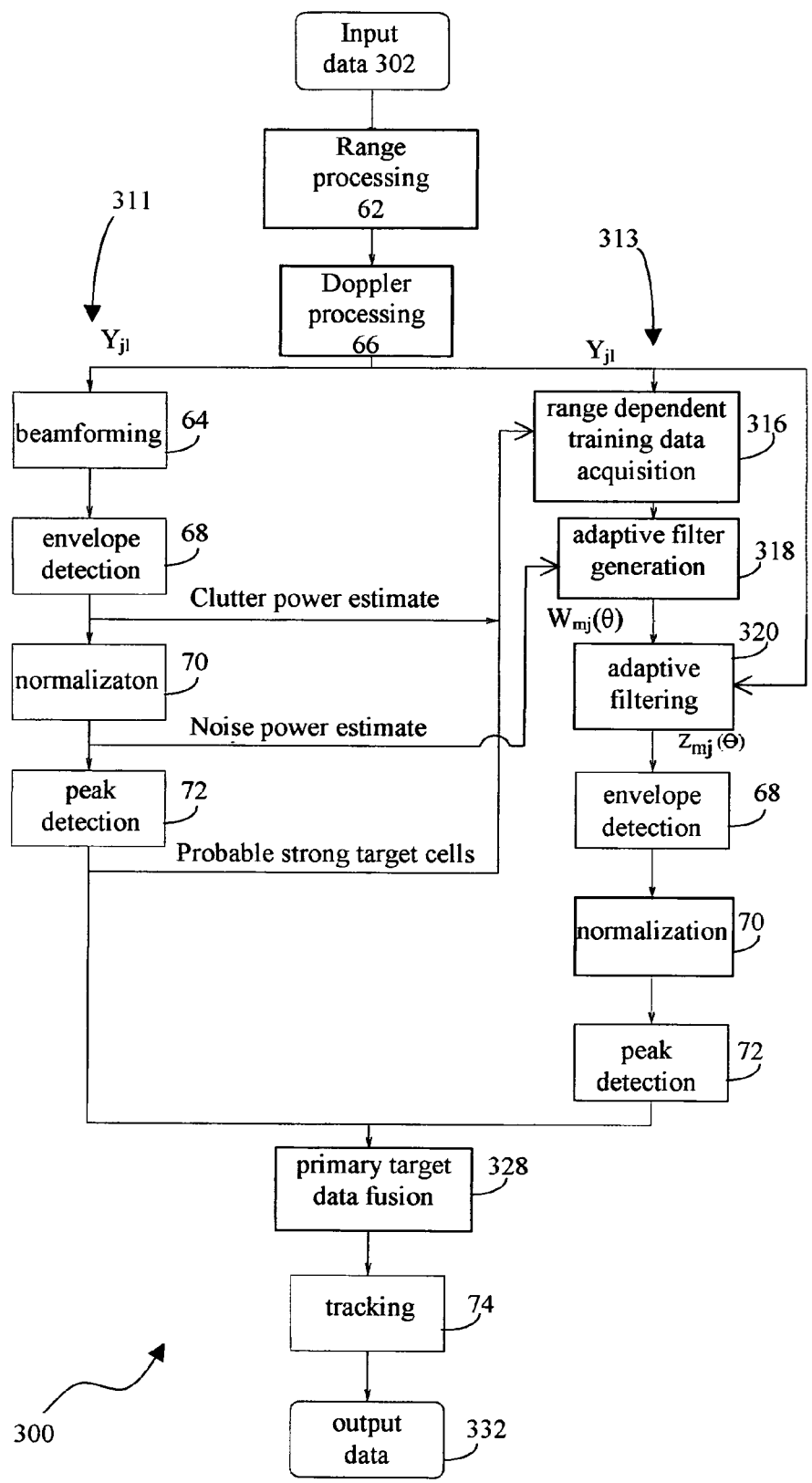
FIG. 6 is a flow diagram of an adaptive data process executed by a data processing system of the receiver.

In order to mitigate the effects of ionospheric clutter, an adaptive process 300, as shown in FIG. 6, is executed by the receiving system 24. The adaptive process 300 retains the basic steps of the standard data process of FIG. 5 for producing conventional data, but adds a number of adaptive processing steps for revealing hidden low level signals. The flow diagram of FIG. 6 has two main branches 311, 313 to illustrate this division. The steps of the process for generating conventional processed data are shown in a conventional processing branch 311; the new steps used to generate adaptive processing data are shown in an adaptive processing branch 313.

The adaptive process 300 begins at step 302, when antenna signals are received and digitised by the multi-channel digital receiver 40. The resulting digital signals are sent to the range & Doppler processing system 46 where they undergo conventional range 62 and Doppler 66 pro cessing. The resulting range-Doppler processed data is a 32-variate complex vector $Y_{jl}$:

$$Y_{jl} = [y_{jl}^{(1)}, y_{jl}^{(2)}, \ldots, y_{jl}^{(32)}]^T \quad (1)$$

where j is the range bin number, l is the Doppler bin number, and T denotes transposition.

This range-Doppler processed data is used by both branches 311, 313 of the adaptive process 300. The conventional processing branch 311 is executed first, as follows. The range-Doppler processed data is first sent via the network hub 58 to the conventional beamforming system 48 where conventional beamforming 64 is performed. The resulting data is sent to the envelope detection/normalisation/peak detection system 50, where envelope detection 68 is first performed. The envelope detection 68 generates cell power estimates for each range-Doppler-azimuth resolution cell using the cell amplitudes. An ionospheric clutter power estimate is generated for each cell by averaging the cell power estimates for a specified number of adjacent Doppler cells with the same range and azimuth by using a specified window that can be considered to slide across the Doppler cells. The Doppler cells occupied by dominant sea clutter are identified on the basis of the transmit frequency and the characteristic Bragg lines and are excluded from this averaging process. Normalisation 70 is then performed to generate a background noise power estimate by averaging the cell powers across all Doppler cells within all "negative" ranges 82, with reference to FIG. 8.

Peak detection 72 is then performed to generate data identifying probable target cells. A cell is identified as a probable target cell if its cell power estimate exceeds its ionospheric clutter (or noise in the absence of clutter) power estimate by a threshold value. This data is sent to the primary target fusion & tracking system 54 and the adaptive processing system 52. This completes the conventional processing branch 311 of the adaptive process 300, and the steps of the adaptive processing branch 313 are then executed.

The clutter power estimates and the data identifying probable target cells are used by the adaptive processing system 52 to define training data $\Omega$ at step 316. The training data $\Omega$ is defined by selecting data from the range and Doppler processed data $Y_{jl}$ generated at step 306. Due to the variable properties of the ionospheric clutter, the training data $\Omega$ may include cells with operational ranges that always include strong sea clutter. However, because the ionospheric clutter is typically only a few dB above the noise floor, very effective sea-clutter resolution is required in order to obtain uncontaminated sea-clutter-free samples for successful training. For this reason, Doppler processing is performed prior to adaptive spatial filtering, and the training data $\Omega$ only includes Doppler cells occupied by ionospheric clutter, i.e. the training data $\Omega$ is selected by including cells that have a ionospheric clutter power estimate exceeding a noise power threshold value, but excluding cells containing probable targets or sea clutter. Probable target cells are excluded from the training data $\Omega$ because otherwise target data can be suppressed by the adaptive processing. At step 318, the training data $\Omega$ is used to generate an adaptive antenna response or filter $W_{mj}(\theta)$ for each range j, according to:

$$W_{mj}(\theta) = \frac{\left[\alpha I_{32} + \sum_{k=j}^{j+m}\sum_{l\in\Omega} Y_{kl}Y_{kl}^H\right]^{-1} S(\theta)}{S^H(\theta)\left[\alpha I_{32} + \sum_{k=j}^{j+m}\sum_{l\in\Omega} Y_{kl}Y_{kl}^H\right]^{-1} S(\theta)} \quad (2)$$

where m is an adjustable parameter with a default value of 3, as described below, $\alpha$ is a loading factor, as described below, $I_{32}$ is a 32×32 diagonal unity matrix, H denotes Hermitian conjugation, i.e., complex conjugation and transposition, and $S(\theta)$ is the steering vector that corresponds to the (calibrated) antenna geometry and steering (i.e., beam) direction $\theta$.

The first term within square parentheses in equation (2), the product $\alpha I_{32}$, is referred to as a loading matrix, and its inclusion makes the adaptive process robust and improves its convergence properties, as described in Y. I. Abramovich, *A controlled method for optimisation of filters using the criterion of maximum SNR*, Radio Eng. Electron. Phys. 26(3), 1981, pp 87–95. The loading factor $\alpha$ is selected to be at least 2 dB greater than the background noise power estimate generated by the normalisation step 70 of the conventional processing branch 311. The second term within square parentheses, $\Sigma_{k=j}^{j+m}\Sigma_{l\in\Omega}Y_{kl}Y_{kl}^H$, is referred to as the sample matrix, and together, the terms within square parentheses constitute a loaded sample matrix. The adaptive filter generation step 318, defined by equation (2), is a form of loaded sample matrix inversion.

For the thirty-two doublet vertically polarised broadside calibrated antenna array 20, the steering vector $S(\theta)$ is determined in the standard manner:

$$S(\theta)^T = \left[1, \exp\left(-i2\pi\frac{d}{\lambda}\sin\theta\right), \ldots, \exp\left(-i31\pi\frac{d}{\lambda}\sin\theta\right)\right] \quad (3)$$

where d is interdoublet spacing, equal to 15 m; $\lambda$ is the operational wavelength of the transmitted signal; and $\theta$ is the beam direction, calculated relative to boresight.

To reduce the processing load on the adaptive filtering system 52, the adaptive filter generation step 318 determines adaptive filters $W_{mj}(\theta)$ that can be shared by a number of consecutive ranges, as indicated by the parameter m, with a default value of m=3.

However, the best performance is obtained when a unique filter is generated for every range bin, i.e., with m=1.

Having generated the adaptive filter at step 318, the adaptive filtering system 52 performs adaptive filtering 320 on the range and Doppler processed data $Y_{jl}$, using the adaptive filter $W_{mj}(\theta)$ to generate adaptive beamformed output data $Z_{jl}(\theta)$, as follows:

$$Z_{jl}(\theta) = W_{mj}^H(\theta)Y_{jl} \quad (4)$$

The adaptive filtering 320 is an adaptive beamforming process, similar to conventional beamforming 64. The adaptive filtered data is sent to the envelope detection/normalisation/peak detection system 50 for envelope detection 68, normalisation 70, and peak detection 72. The resulting data is sent to the primary target fusion & tracking system 54.

The two branches 311, 313 of the adaptive process 300 join at step 328, executed by the primary target fusion/tracking system 54, where the relatively strong primary targets identified by conventional processing at step 314 and the primary targets revealed by adaptive processing at step 326 are used to identify both strong and weak targets. Target tracking is performed at step 330 to determine the final output data 332. This output data 332 can be displayed and analysed by the display console 56.

Adaptive antenna pattern analysis indicates that the number of beams sufficient for a conventional beamformer is generally not sufficient for the adaptive filter described above. For this reason, a significantly greater number of beams (e.g., 64) are used in order not to lose a target with an unfavorable azimuth (with respect to steering directions).

Figure 10:
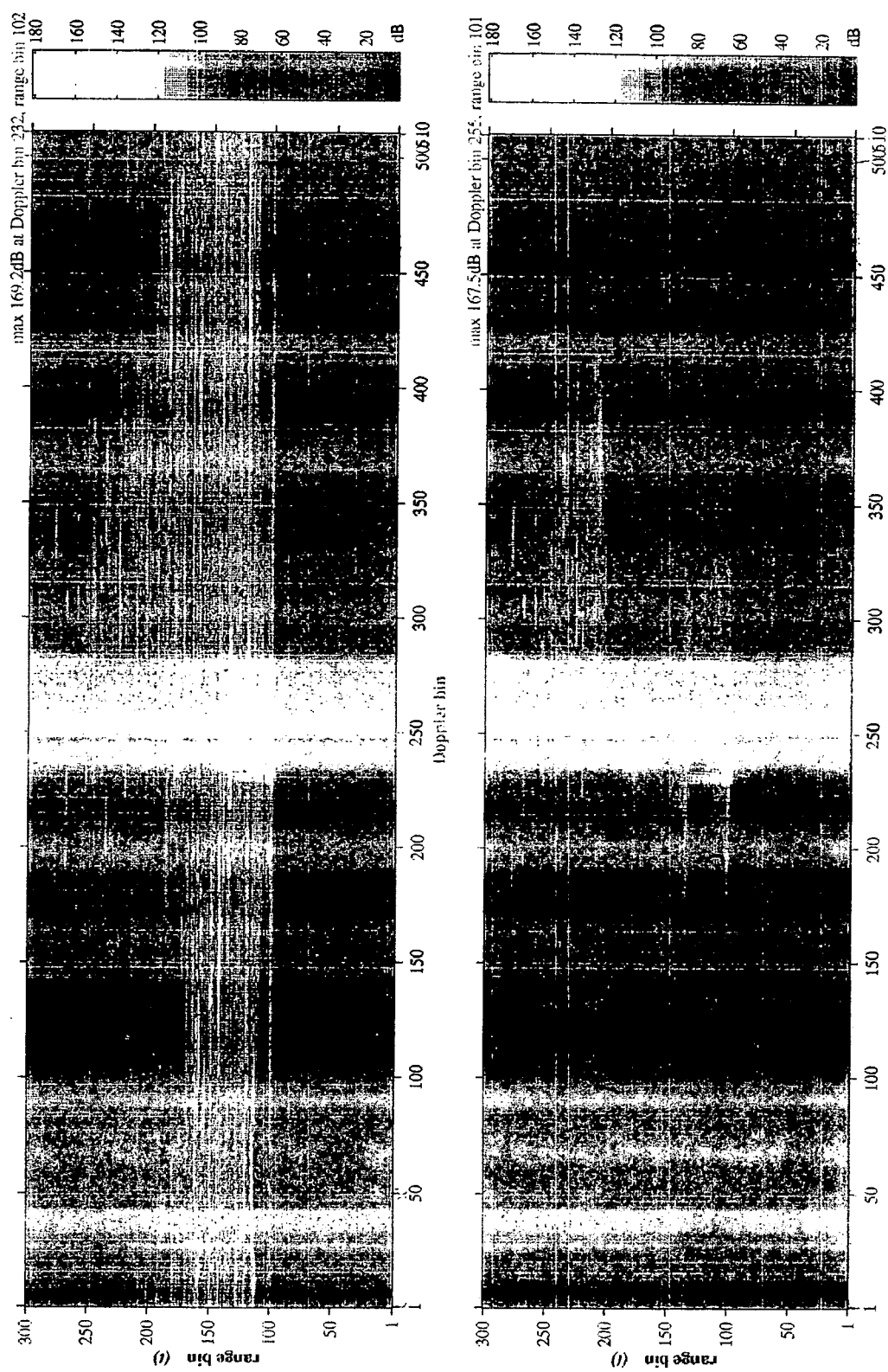
FIG. 10 is a pair of range-Doppler plots of radar data processed by the conventional (top) and adaptive (bottom) data processes.
Figure 11:
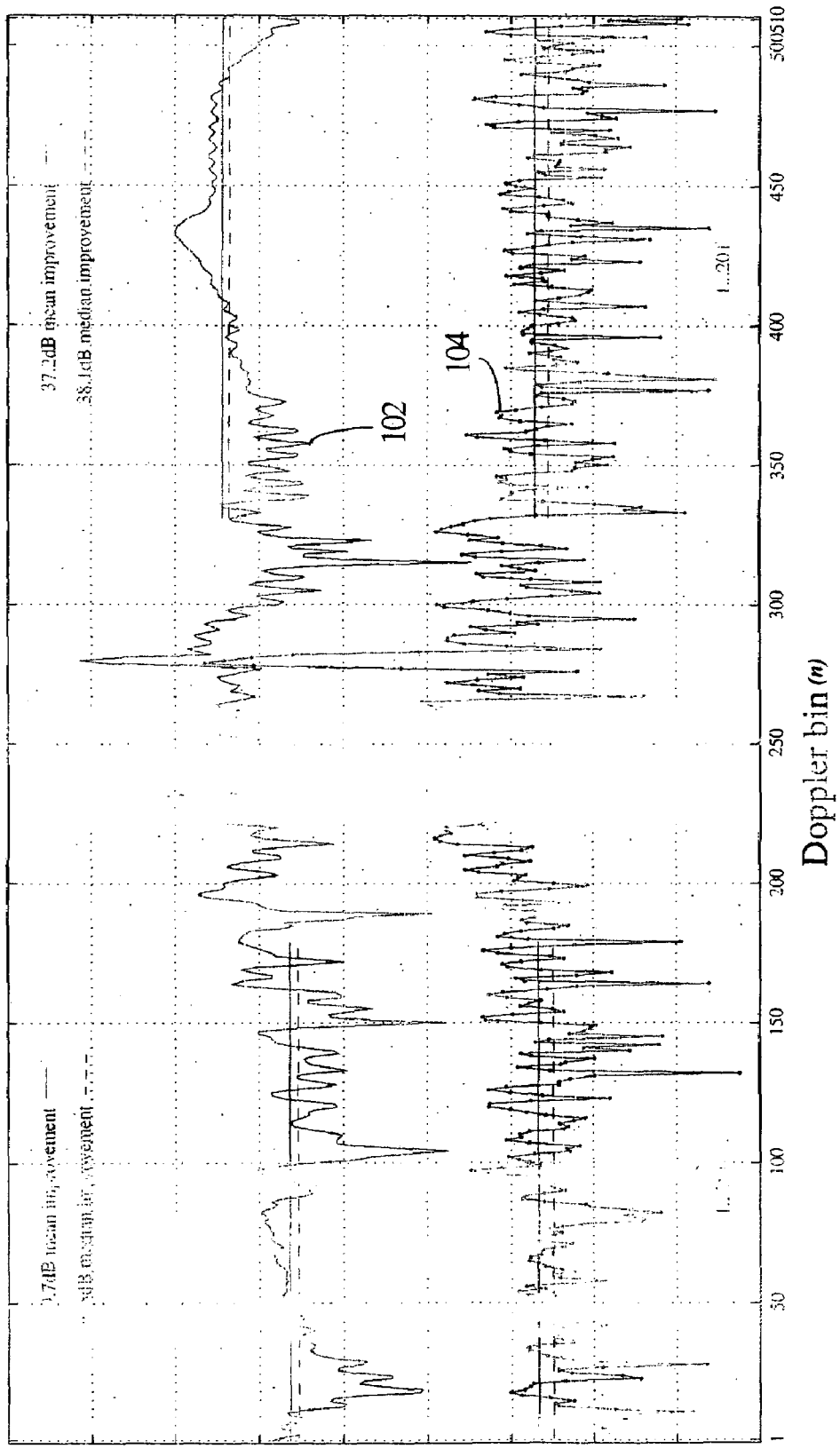
FIG. 11 is a graph of Doppler data for a particular range and azimuth, showing the effect of the adaptive filter on external noise suppression.
Figure 12:
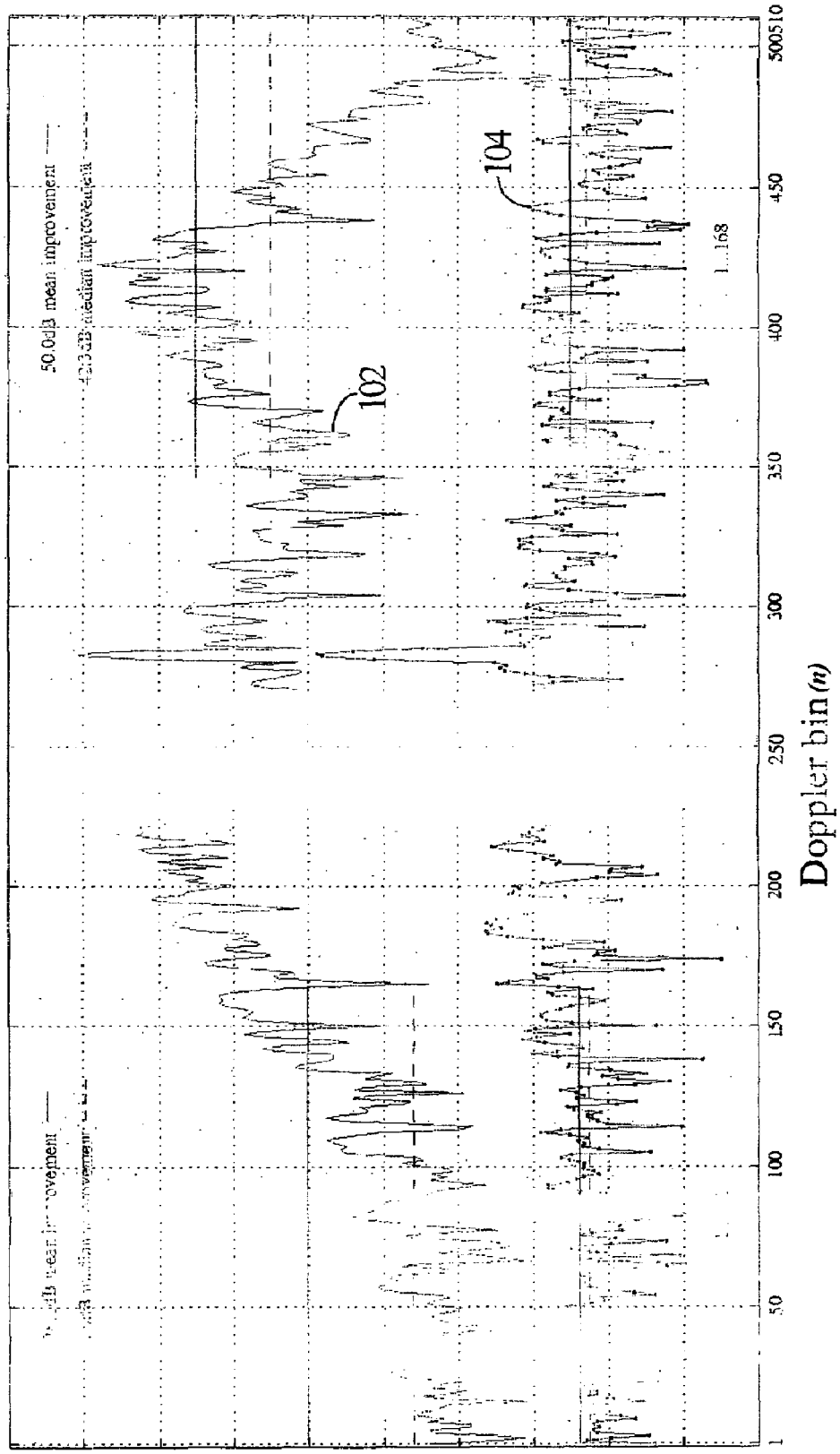
FIGS. 12 to 15 are graphs of Doppler data for different ranges and azimuths, illustrating the spatial inhomogeneity of ionospheric clutter and the effect of the spatial filter on clutter suppression.
Figure 13:
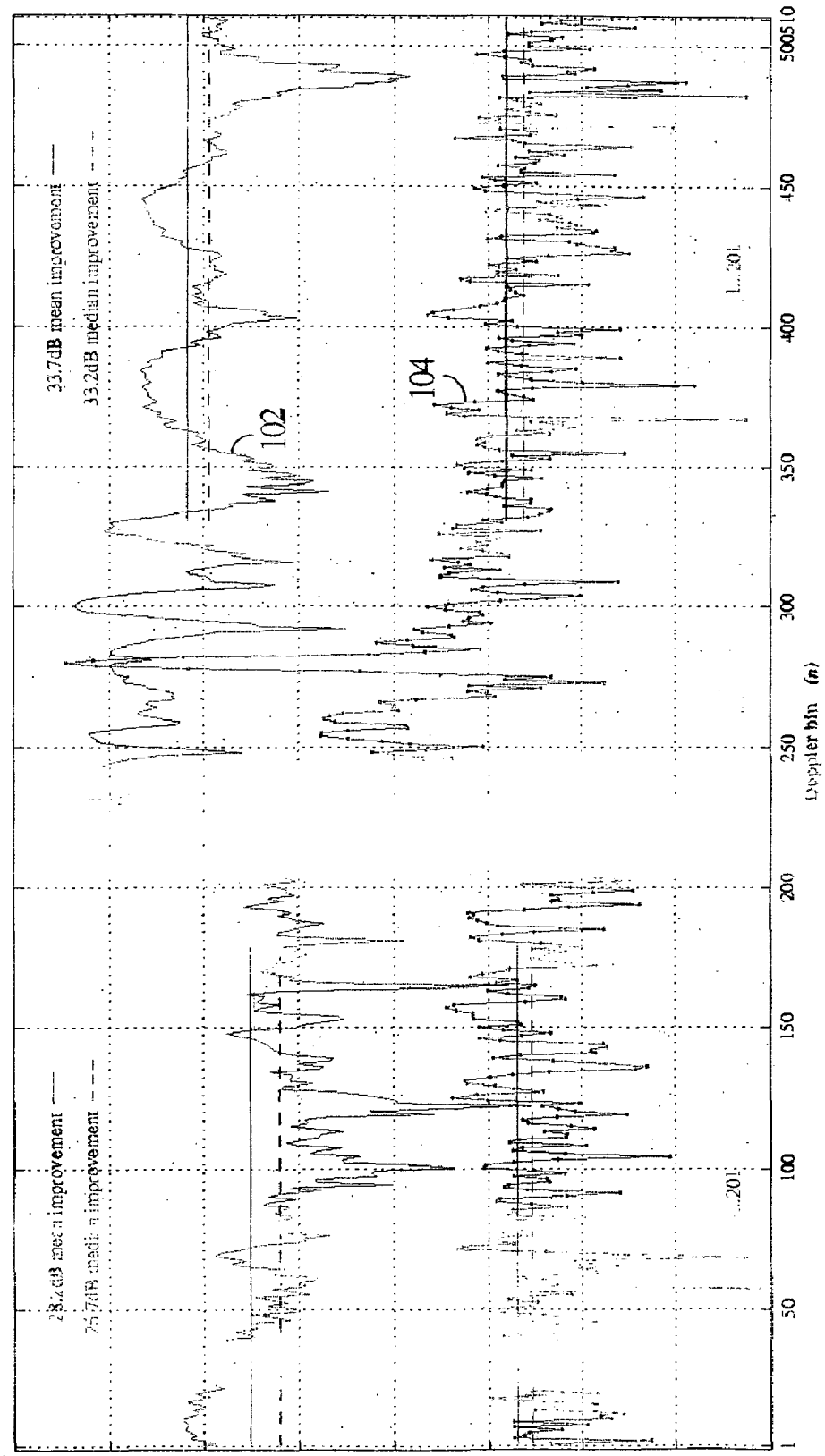
Figure 14:
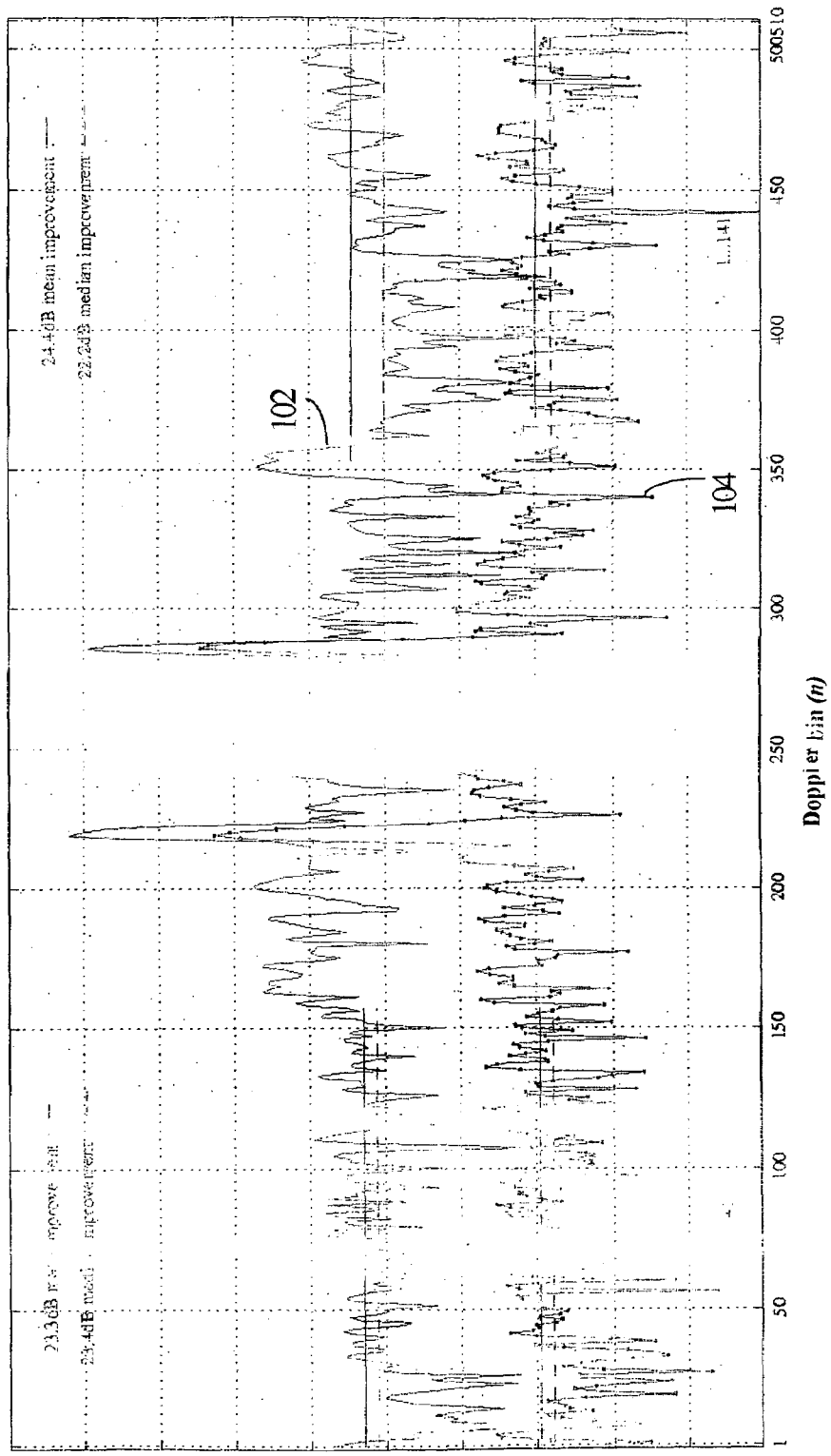
Figure 15:
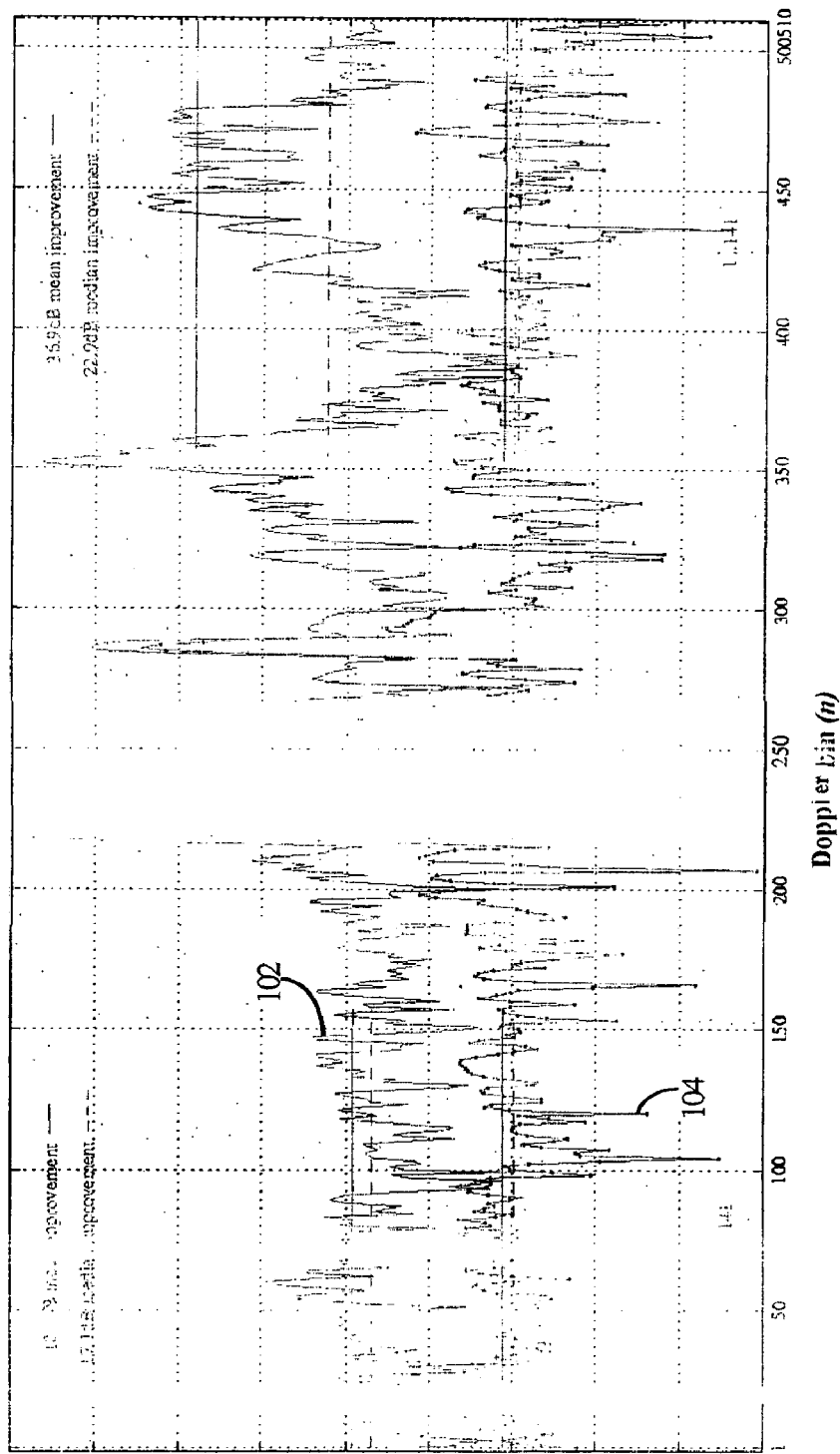

FIG. 10 illustrates the effect of the adaptive process 300 on ionospheric clutter mitigation. The top part of the figure shows a Doppler-range map of data processed by the conventional process of FIG. 5, showing significant levels of ionospheric clutter spread across a broad range of Doppler and range cells. The lower part of FIG. 10 shows the corresponding Doppler-range map of data processed by the adaptive process 300. Although the clutter has not been completely eliminated, it has been significantly reduced.

More quantitative examples of ionospheric clutter mitigation in Doppler data are shown in FIGS. 11 to 15, illustrating particular "range cuts" for different beams where results of conventional beamforming 102 are compared with the results of adaptive processing 104. Taken together, these Figures illustrate the variable nature of the ionospheric clutter for different ranges. Considering the most heavily contaminated range cells, it was found that, as shown in FIG. 7, ionospheric clutter does not occupy the entire Doppler band. However, this spread is sufficient to mask most of the targets of interest and, specifically, all surface targets.

The adaptive process 300 also provides mitigation of interference from other sources. For example, in cases where external noise is present, significant external noise power reduction can also be achieved as a result of adaptive processing, as shown in FIG. 10.

Overall, it was found that weak targets deeply immersed in ionospheric clutter can be reliably detected by the adaptive process 300, despite losses that are correlated with the target strength. In order to reduce target signal degradation and/or to increase the dynamic range of successfully detected targets, the calibration accuracy is maintained as high as possible. In radar systems where the transmitter is located in the back (reduced) lobe of a receiving array doublet, an active repeater (e.g., on oil rigs) is preferably deployed. Strong targets identified by conventional processing at step 314 can be used for adaptive antenna calibration.

The embodiment described above relates to data collected using the broadside antenna array 20 of thirty-two dipoles only. In an alternative embodiment, the receiver 14 includes a second, endfire array 22 of vertically polarised antenna elements 35. The endfire array 22 is oriented perpendicular and adjacent to the broad side array 20 to form a two-dimensional (2-D) antenna array, as shown in FIG. 2. The antenna elements 35 of the endfire array are preferably monopole antenna elements, but may alternatively include doublets. Doublets are preferable if the transmitter antenna 16 is located behind the receiving antenna arrays 20, 22. For 2-D antennas, the steering vector S(θ) in equation (2) is calculated in accordance with antenna geometry for a given azimuth θ and zero elevation angle.

The 2-D antenna array allowed 2-D adaptive clutter mitigation to be performed for various antenna configurations. The data processing system 24 allows individual antenna elements of the broadside array 20 and the endfire array 22 to be selectively switched for input to the digital receiver 40 to adjust the receive site antenna configuration. This allows the endfire array 22 to be excluded, and different 2-D configurations, such L and T shaped configurations, to be employed. For example, sixteen broadside dipoles (BD) and sixteen endfire monopoles (EM) can be combined to form a 16BD+16EM configuration. As described above, the number of independent antennas was limited to thirty-two by the number of data channels available in the digital receiver 40. However, it will be apparent that an alternative or additional digital receiver 40 can be used in order to provide more data channels and therefore allow more antenna elements to be used.

Figure 16:
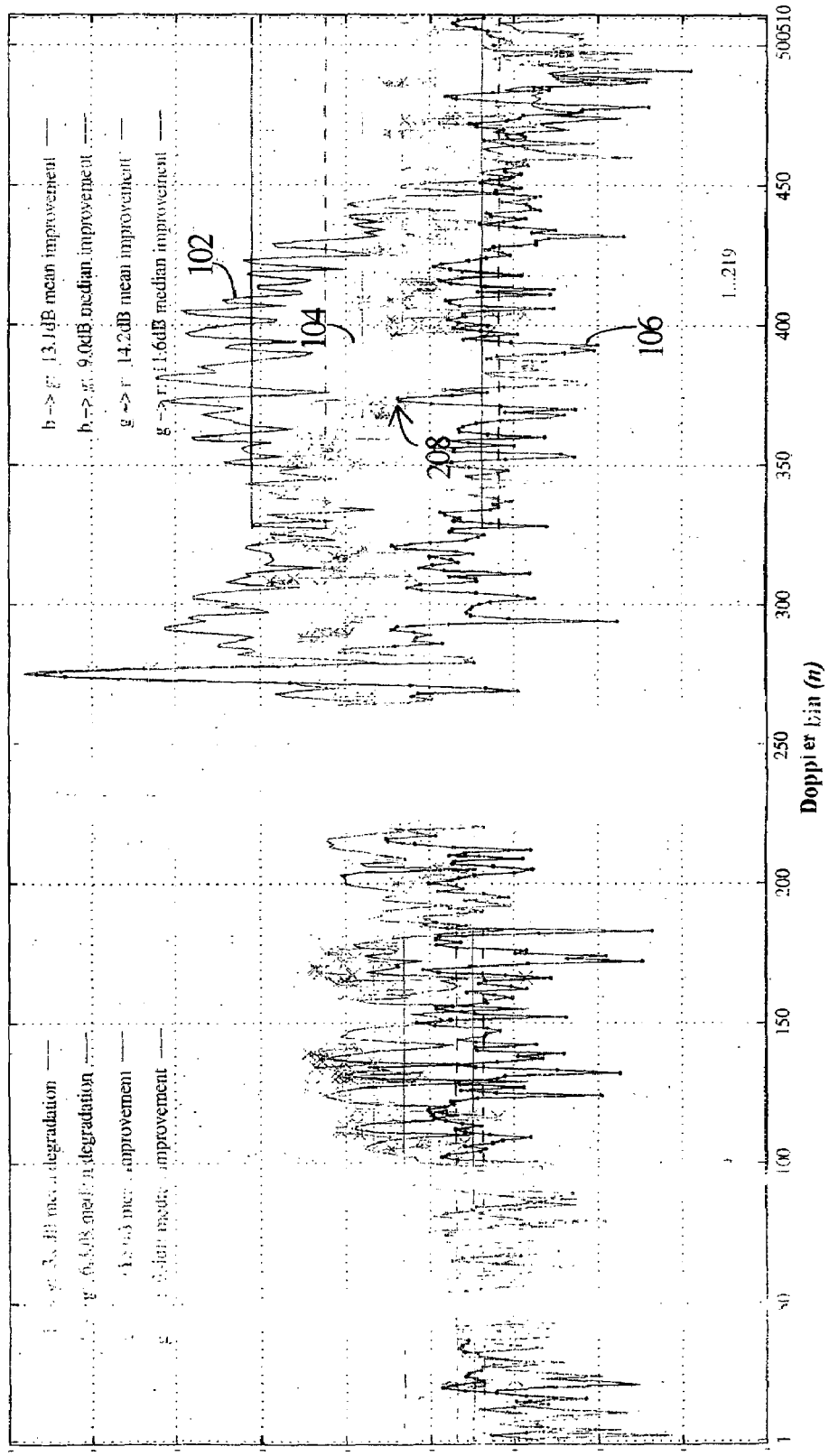
FIG. 16 is a graph of Doppler data for a particular range and azimuth, for conventional, 1-D adaptive and 2-D adaptive processing.

The 2-D adaptive processing was found to be superior to 1-D adaptive processing for ionospheric clutter mitigation. Although 1-D adaptive processing is generally quite effective, both the estimated clutter suppression and the signal-to-interference ratio for particular targets are significantly improved by 2-D processing, often revealing hidden targets, as shown in FIG. 16. In this data set, the conventional beamforming process data 102 shows a high degree of ionospheric clutter in Doppler bins greater than 250. The 1-D adaptive processed data 104 shows a reduced amount of clutter, but the 2-D processed data 106 shows a similar degree of reduction again, and reveals a hidden target peak 208 at bin number 373.

Overall, the most advantageous 2-D configurations are L-shaped or T-shaped antenna array configurations without a significant gap (e.g., the gap should be some tens of metres or less) between broad-side and end-fire arms and within the arms; 16BD+16EM is preferred, but 22BD+10EM (or ED) was found to be the second best. Depending on the severity of ionospheric clutter contamination, the improvement in ionospheric clutter (per range) power resulting from using a 2-D receiver, as opposed to a 1-D receiver, was between 5–25 dB for ship mode, and 2–15 dB for air mode.

For adaptive beamforming, and specifically for adaptive beamforming that involves an L-shaped antenna array, traditional (beam-maximum) techniques for target azimuth estimation can be inaccurate due to significant pattern deformation. Azimuth estimation techniques that take into account antenna pattern deformation are preferably used to provide a more accurate value for the target azimuth, as described in R. C. Davis, L. E. Brennan and I. S. Reed, *Angle Estimation with Adaptive Arrays in External Noise Fields*, IEEE Trans. Aero. Elect. Sys. 12 (2), (1976), pp 176–186.

Many modifications will be apparent to those skilled in the art without departing from the scope of the present invention as herein described with reference to the accompanying drawings.

The invention claimed is:

1. A surface wave radar system including:
   a receive antenna array for generating receive signals; and
   a data processing system for processing received data representing said receive signals to mitigate ionospheric clutter, wherein the ionospheric clutter is generated by backscattering of transmit signals transmitted by the system.

2. A surface wave radar system as claimed in claim 1, wherein the processing of said data processing system includes filtering said received data on the basis of ionospheric clutter data generated from said received data.

3. A surface wave radar system as claimed in claim 2, wherein said data processing system includes an adaptive filter to perform said filtering, said filter being trained on the basis of said ionospheric clutter data generated by determining clutter estimates for selected cells of said received data.

4. A surface wave radar system as claimed in claim 3, wherein said data processing system includes a range and Doppler processor, a beamformer and detector for generating cells of processed radar data from said received data and generating said ionospheric clutter data, noise power data and probable target data for said cells, said ionospheric clutter data representing ionospheric clutter power, and said adaptive filter is trained using data of said cells having ionospheric clutter power above a noise threshold determined by said ionospheric clutter data and said noise power data, excluding data of cells identified by said probable target data and cells representing sea clutter.

5. A surface wave radar system as claimed in claim 4, wherein the processed radar data filtered by said adaptive filter is processed by said detector to generate probable target data.

6. A surface wave radar system as claimed in claim 5, wherein said filter is based on loaded sample matrix inversion.

7. A surface wave radar system as claimed in claim 6, wherein said filter executes $$W_j(\theta) = \frac{\left[\alpha I + \sum_{l \in \Omega} Y_{jl} Y_{jl}^H\right]^{-1} S(\theta)}{S^H(\theta)\left[\alpha I + \sum_{l \in \Omega} Y_{jl} Y_{jl}^H\right]^{-1} S(\theta)},$$

where $Y_{jl}$ is a complex vector of said received data range-Doppler processed, $\Omega$ represents the training data, H denotes complex conjugation and transposition, j is a range bin number, l is a Doppler bin number, $\alpha$ is a loading factor, I is a diagonal unity matrix, and $S(\theta)$ is a steering vector corresponding to geometry of said array and a steering direction $\theta$.

8. A surface wave radar system as claimed in claim 7, wherein said loaded sample matrix inversion is $$W_{mj}(\theta) = \frac{\left[\alpha I + \sum_{k=j}^{j+m} \sum_{l \in \Omega} Y_{kl} Y_{kl}^H\right]^{-1} S(\theta)}{S^H(\theta)\left[\alpha I + \sum_{k=j}^{j+m} \sum_{l \in \Omega} Y_{kl} Y_{kl}^H\right]^{-1} S(\theta)},$$

and a filter $W_{mj}(\theta)$ is shared by m consecutive range bins.

9. A surface wave radar system as claimed in claim 1, wherein said receive antenna array is a one-dimensional receive antenna array.

10. A surface wave radar system as claimed in claim 9, wherein said array includes a one dimensional broadside array of vertically polarised doublets, said broadside array being substantially perpendicular to a receiving direction of said antenna, and each of said doublets being substantially parallel to said receiving direction.

11. A surface wave radar system as claimed in claim 1, wherein said receive antenna array is a two-dimensional receiving antenna array.

12. A surface wave radar system as claimed in claim 11, wherein said array includes a one dimensional broadside array of vertically polarized doublets, said broadside array being substantially perpendicular to a receiving direction of said antenna, and each of said doublets being substantially parallel to said receiving direction, and an endfire array of vertically polarized antennas substantially perpendicular and adjacent to said broadside array.

13. A surface wave radar system as claimed in claim 12, wherein said array forms an L shape.

14. A surface wave radar system as claimed in claim 12, wherein said array forms a T shape.

15. A surface wave radar system as claimed in claim 12, wherein said endfire array includes one of monopoles and doublets, each of said doublets being substantially parallel to said receiving direction.

16. A method for processing range and Doppler processed data in a surface wave radar receiver, including, for each range, the steps of:
   training a spatial adaptive filter using training data of said processed data, said training data including ionospheric clutter data and excluding target data; and
   filtering said processed data using said filter.

17. A method as claimed in claim 16, including beamforming said processed data, and identifying said ionospheric clutter data and said target data by comparing the beamformed data with at least one threshold value.

18. A method as claimed in claim 17, wherein said training data excludes cells which contain substantial sea clutter.

19. A method as claimed in claim 18, wherein said filter is based on loaded sample matrix inversion.

20. A method as claimed in claim 19, wherein said filter executes $$W_j(\theta) = \frac{\left[\alpha I + \sum_{l \in \Omega} Y_{jl} Y_{jl}^H\right]^{-1} S(\theta)}{S^H(\theta)\left[\alpha I + \sum_{l \in \Omega} Y_{jl} Y_{jl}^H\right]^{-1} S(\theta)},$$

where $Y_{jl}$ is a complex vector of said received data range-Doppler processed, $\Omega$ represents the training data, H denotes complex conjugation and transposition, j is a range bin number, l is a Doppler bin number, $\alpha$ is a loading factor, I is a diagonal unity matrix, and $S(\theta)$ is a steering vector corresponding to geometry of said array and a steering direction $\theta$.

21. A method as claimed in claim 20, wherein said loaded sample matrix inversion is $$W_{mj}(\theta) = \frac{\left[\alpha I + \sum_{k=j}^{j+m} \sum_{l \in \Omega} Y_{kl} Y_{kl}^H\right]^{-1} S(\theta)}{S^H(\theta)\left[\alpha I + \sum_{k=j}^{j+m} \sum_{l \in \Omega} Y_{kl} Y_{kl}^H\right]^{-1} S(\theta)},$$

and a filter $W_{mj}(\theta)$ is shared by m consecutive range bins.

22. A surface wave radar system comprising:
   a transmitter operable to transmit high frequency signals;
   a receive antenna array operable to receive reflected versions of the transmitted high frequency signals and generate receive signals; and
   a data processing system operable to process the receive signals,
   wherein the processed receive signals are operable to remove ionospheric clutter received as part of the reflected versions of the transmitted high frequency signals.

* * * * *